United States Patent [19]

Weber et al.

[11] Patent Number: 5,196,497

[45] Date of Patent: Mar. 23, 1993

[54] PROCESS FOR THE PRODUCTION OF ALKOXY-TERMINATED POLY-(DIORGANOSILOXANES)

[75] Inventors: Wilhelm Weber; Theo Achtenberg; Karl-Heinz Sockel, all of Leverkusen; Hans Sattlegger, Odenthal, all of Fed. Rep. of Germany

[73] Assignee: Bayer Aktiengesellschaft, Leverkusen, Fed. Rep. of Germany

[21] Appl. No.: 726,602

[22] Filed: Jul. 8, 1991

[30] Foreign Application Priority Data

Jul. 17, 1990 [DE] Fed. Rep. of Germany ....... 4022661

[51] Int. Cl.$^5$ .............................................. C08G 77/06
[52] U.S. Cl. ....................................... 528/14; 528/34; 525/477; 556/466; 556/469
[58] Field of Search ................... 528/14, 34; 525/477; 556/466, 469

[56] References Cited

U.S. PATENT DOCUMENTS 3,383,355  5/1968  Cooper ................................. 528/14
4,532,315  7/1985  Letoffe et al. ........................ 528/14

FOREIGN PATENT DOCUMENTS 0382365  8/1990  European Pat. Off. .

*Primary Examiner*—Melvyn I. Marquis
*Attorney, Agent, or Firm*—Sprung Horn Kramer & Woods

[57] ABSTRACT

The present invention relates to a process for the production of diorganyloxyorganosilyl- or triorganyloxysilyl-terminated poly(di-organosiloxanes) by reaction of $\alpha,\omega$-dihydroxypoly(diorganosiloxanes) with alkoxysilanes in the presence of catalytically active strong alkali metal bases.

7 Claims, No Drawings

PROCESS FOR THE PRODUCTION OF ALKOXY-TERMINATED POLY-(DIORGANOSILOXANES)

BACKGROUND OF THE INVENTION

This invention relates to the production of diorganyloxyorganosilyl- or triorganyloxysilyl-terminated poly(diorganosiloxanes) by reaction of α,χ-dihydroxypoly(diorganosiloxanes) with alkoxysilanes in the presence of catalytically active strong alkali metal bases.

There are already several known processes for the production of the polymers according to the invention and formulations containing such polymers. The products are used for the production of one-component silicone pastes which cure in the presence of moisture to form elastomers which are referred to hereinafter as RTV-1C compounds.

U.S. Pat. No. 3,161,614 describes the reaction of α,χ-dihydroxypoly(diorganosiloxanes) with polyfunctional halosilanes, for example $SiCl_4$ or $CH_3SiCl_3$. The resulting halogen-containing polysiloxanes are then converted into di- or triorganyloxysilyl-terminated polysiloxanes by reaction with alcohols in the presence of acid-binding agents. The same patent specification also mentions the reaction of α,χ-dihydroxypoly(diorganosiloxanes) with alkoxysilanes in the presence of suitable catalysts, such as amines and metal carboxylates.

The production of RTV-1C compounds is described in EP 21 859 and in EP 69 256. According to these publications, α,χ-dihydroxypoly(diorganosiloxanes) are reacted with alkoxysilanes in the presence of amines to form the polymers according to the invention.

EP 70 786 describes the use of hydroxylamine derivatives instead of amines as catalysts.

Silanes of mixed functionality are also known and may be reacted with α,χ-dihydroxypoly(diorganosiloxanes) in contrast to pure organyloxy or organyloxyorganosilanes to form the polysiloxanes produced in accordance with the invention, even in the absence of catalysts. The silanes in question include alkoxyamidosilanes (DE-PS 1 247 646), alkoxyoximinosilanes (EP 98 369) and alkoxyacetoxysilanes (U.S. Pat. No. 3,296,195).

DE-PS 3 523 206 claims the use of ammonium carbamates, preferably $(CH_3)NH_2OCON(CH_3)_2$, as catalyst for the reaction of OH-terminated polysiloxanes with alkoxysilanes.

Mixtures of amines and carboxylic acids are described as catalysts for the same reaction in EP-PS 137 883.

All hitherto described processes for the production of the polysiloxanes mentioned have disadvantages. The process in which α,χ-dihydroxypoly(diorganosiloxanes) are reacted with halosilanes, followed by alcoholysis (U.S. Pat. No. 3,161,614), leads to polymers which contain corrosive ammonium salts and is complicated.

Alkoxysilanes of mixed functionality, which contain an amido, amino, oximino or carboxylato group in addition to the alkoxy groups, give the desired triorganyloxysilyl- or diorganyloxyorganosilyl-terminated poly(diorganosiloxanes) by reaction with α,χ-dihydroxypoly(diorganosiloxanes). However, the preparation of the silanes is generally expensive and the removal of the cleavage products necessitates separate process steps in the preparation of the formulations or is impracticable. However, the removal of the cleavage products formed from the silanes mentioned would be desirable for the formulation of chemical neutral, transparent polysiloxane compounds. Accordingly, it is preferred to react OH-terminated polysiloxanes with alkoxysilanes in the presence of suitable catalysts.

All the hitherto described catalysts or catalyst systems have the disadvantage that they necessitate long reaction times and elevated temperatures. In addition, the catalysts have to be used in substantial quantities and, in most cases, are difficult or even impossible to remove from the mixtures. This applies to amines, hydroxylamine derivatives and mixtures of amines and carboxylic acids. Although the process which uses carbamates, such as $(CH_3)_2NH_2OCON(CH_3)_2$, is more suitable, it does involve the handling of considerable quantities of dimethylamine. In addition, it is confined to termination with methoxysilanes. Accordingly, it would be desirable to have a process which could be carried out simply in a short reaction time and which could even be applied to less reactive alkoxysilanes, for example ethoxysilanes.

The use of strong bases as catalysts would actually be logical. However, no such process has yet been described. On the contrary, strong bases, such as KOH or NaOH, were not considered suitable as catalysts in the prior art because they rapidly produced unwanted rearrangement reactions involving the polymer chain. For example, it is known that branched monoalkoxy-terminated polysiloxanes are formed from trialkoxy or tetraalkoxysilanes and cyclotetra(dimethylsiloxane) in the presence of strong bases, such as KOH or potassium siloxanolate (U.S. Pat. No. 2,909,549). α,χ-Dihydroxypoly(dimethylsiloxanes) also lead to the same product by reaction with methyl trimethoxysilane in the presence of KOH. However, it is not possible to produce a practicable RTV-1C system from monoalkoxy-terminated polymers such as these which contain the terminal group-$OSi(CH_3)_2OCH_3$ for example.

DESCRIPTION OF THE PREFERRED EMBODIMENTS

It has now surprisingly been found that triorganyloxysilyl- or diorganyloxyorganosilyl-terminated poly(diorganosiloxanes) can be produced from α,χ-dihydroxypoly(diorganosiloxanes) and tetraorganyloxysilanes or triorganyloxyorganosilanes by a process which is characterized in that strongly basic alkali metal compounds are used as the catalysts, being neutralized after the desired reaction and before the onset of product-damaging rearrangement reactions.

Although the catalytic activity of strong bases on mixtures of polysiloxanes and alkoxysilanes was known, the process according to the invention was by no means a logical development. This is because it could not be foreseen that it would be possible to carry out the desired termination step in such a way that the unwanted polymer rearrangement did not occur.

Any known α,χ-dihydroxypoly(diorganosiloxanes) are suitable for the process according to the invention, the organyl groups preferably being methyl groups. Poly(diorganylsiloxanes) containing phenyl groups in addition to methyl groups are mentioned as another example.

Compounds of the following type

in which the index m is 0 or 1, $R^1$ may be a monofunctional alkyl, aryl or alkenyl radical and $R^2$ may be a monofunctional alkyl radical, are suitable for the reaction with the $\alpha,\chi$-dihydroxypoly(diorganosiloxanes). The following are mentioned as examples of such compounds: $Si(OCH_3)_4$, $Si(OC_2H_5)_4$, $Si[OCH(CH_3)_2]_4$, $CH_3Si(OCH_3)_3$, $CH_3Si(OC_2H_5)_3$, $CH_2=CHSi(OC_2H_5)_3$, $C_6H_5Si(OCH_3)_3$ and $CH_3Si[OCH_2CH(CH_3)_2]_3$. However, the substituent $R^1$ may also bear functional groups, as for example in the compounds $XCH_2CH_2CH_2SI(OR^2)_3$ with

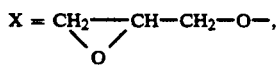

HS-, $H_2N$, $R_2N$, $H_2NCH_2CH_2NH-$ or $CH_2=C(CH_3)COO-$. Some of these compounds even react with dihydroxypoly(dimethylsiloxanes) (aminoalkylsilanes) in the absence of catalysts. In cases such as these, the reaction times can be shortened and the reaction temperatures reduced by the process according to the invention, which can afford advantages so far as the subsequent process of the products is concerned (one-pot process).

Suitable catalyst bases are strong bases, such as alkali metal hydroxides and silanolates or alcoholates thereof. Potassium and sodium compounds are preferred. Although tetraalkyl ammonium hydroxides are also suitable, they have the disadvantage of leaving aminic constituents behind in the polymer. The same also applies to alkali metal amides. The base concentration required for catalysis is between 0.1 and 100 ppm. It is influenced by whether the polysiloxane contains residues of acidic, basic or buffer-like constituents emanating from the polymerization process.

Strong and weak acids, such as HCl, $H_2SO_4$, $H_3PO_4$, carboxylic acids and $CO_2$ are suitable for neutralization. Pyrogenic silica may also be used in cases where subsequent processing to silica-containing mixtures is intended. It is preferred to use HCl and HCl-releasing additives, such as chlorosilanes, for example $(CH_3)_3SiCl$, $(CH_3)_2SiCl_2$, $CH_3SiCl_3$ or $SiCl_4$. In most cases, it is advisable to use the acidic neutralizing agent in excess.

The basic and acidic auxiliaries are best brought into a dilute form miscible with the reaction medium. For example, KOH or NaOH may be dissolved in the organyloxysilanes to be reacted, optionally with addition of the corresponding free alcohol.

The conditions under which the process according to the invention can be carried out are determined by the reactivity of the organyloxysilane used and by the strength of the base used. In most cases, the process can be carried out at room temperature. The minimum reaction time required for termination and the time at which neutralization has to be carried out may be determined in each individual case. For example, where KOH and methyl trimethoxysilane are used, the period between addition of the base and the neutralizing agent is between 5 and 30 seconds. By contrast, the corresponding period where NaOH is used is between 5 and 20 minutes. The times are also dependent on the quantity of catalyst used, so that it is generally not possible to stipulate the time for characterizing the process according to the invention. However, the reaction time should be selected so that the desired termination is complete, i.e. no more SiOH can be detected and, on the other hand, no harmful polymer rearrangements occur. Polymer rearrangements can be detected by gel permeation chromatography or can be recognized from changes in the viscosity of the reaction mixture. This is because the unwanted polymer rearrangements are reflected in the fact that cleavage of the polymer chain begins with excess alkoxysilane and leads to a distinct reduction in viscosity. The viscosity and its reduction are of course influenced by the excess of organoxysilane. It is advisable to use such an excess to complete the reaction. The excess of alkoxysilane and the alcohol formed as cleavage product may be removed by heating after neutralization of the strong base. For certain applications, for example in moisture-curing silicone sealants, the excess alkoxysilane and the alcohol formed may remain in the polymer in certain formulations.

In cases where very short residence times have to be strictly observed, as explained above with reference by way of example to the use of methyl trimethoxysilane and potassium hydroxide, it is advisable to carry out the process continuously. In that case, the basic and acidic auxiliaries may be combined with the reaction medium in static mixer systems, for example by means of metering pumps.

If the polysiloxanes produced by the process according to the invention are to be used in moisture-curing RTV compounds, the process may also be carried out as a one-pot process in the mixing unit intended for the preparation of these compounds. If the reactive methoxysilanes are to be used in this case, it is preferred to use Na bases rather than potassium compounds on account of the longer residence times. In the production of silicone sealants, it may be advisable to use pyrogenic silica to neutralize the base because it is generally an important constituent of the mixture in any case. However, the choice of the neutralizing agent may be influenced by the choice of the remaining auxiliaries intended for the preparation of the pastes.

The process according to the invention is illustrated by the following Examples.

EXAMPLES

EXAMPLE 1

A mixture of 55 parts by weight of an OH-terminated poly(dimethylsiloxane), which had a viscosity of 50 Pa·s, and 1 part by weight methyl trimethoxysilane was prepared in a planetary mixer. 0.09 part by weight of a catalyst solution of 4% sodium hydroxide and 1% methanol in methyl trimethoxysilane was stirred into the resulting mixture. 10 Minutes after the addition of the catalyst, 0.73 part by weight of a solution of 1% dimethyl dichlorosilane in trimethylsilyl-terminated poly(dimethylsiloxane) having a viscosity of 0.1 Pa·s was added. The reaction mixture was then heated for 2 hours at 140° C./25 mbar in a rotary evaporator.

The resulting polymer mixture was investigated as follows:
a) viscosity measurement using a Haake rotational viscosimeter,
b) analysis by gel permeation chromatography and
c) crosslinking test.

In the crosslinking test c), 5 parts by weight of a test solution were added to 100 parts by weight of the mixture to be tested. This solution had been prepared by dissolving 20% dibutyl tin oxide in tetraethoxysilane at 100.C in the absence of atmospheric moisture. If a rapid increase in viscosity to the point of gelation occurs after addition of the test solution, this may be interpreted as an indication of complete saturation of the SiOH groups of the OH-terminated polysiloxane. If gelation does not occur and if the test mixture cures from the outside inwards in the presence of atmospheric moisture, this may be interpreted as an indication of the desired termination, for example —OSi(OCH₃)₂CH₃. However, if neither rapid gelation nor curing in the presence of atmospheric moisture occurs or if a soft, thin film is only slowly formed, this may be regarded as a sign that the unwanted polymer rearrangement has occurred and branched polymers terminated by —OSi(CH₃-)₂—OCH₃ groups have been formed.

The polymer mixture obtained in Example 1 had a viscosity of 42 Pa·s 24 hours after its preparation. Analysis by gel permeation chromatography revealed a molecule size distribution which corresponded to that of the OH-terminated poly(dimethylsiloxane) used. The crosslinking test did not reveal rapid gelation, but instead produced a completely cured test specimen after 24 hours in the presence of atmospheric moisture (layer thickness 2 mm). It was concluded from these findings that the desired reaction

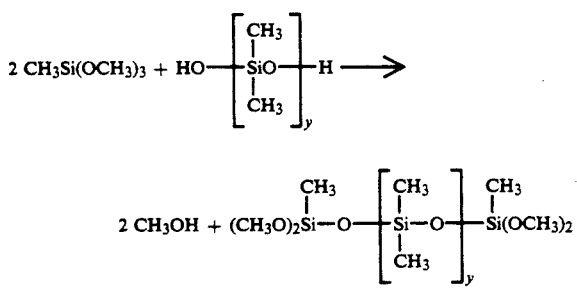

had taken place.

EXAMPLE 2

Comparison Example

Example 1 was repeated without addition of KOH or dimethyl dichlorosilane. The mixture had a viscosity of 43 Pa·s and, in crosslinking test, gelled on addition of the test solution.

EXAMPLE 3

Comparison Example

Example 1 was repeated without addition of dimethyl dichlorosilane. The reaction mixture had a viscosity of 2 Pa·s after 24 hours. By comparison with Example 1, analysis by gel permeation chromatography revealed a distinct shift in the distribution maximum to a smaller molecule size. In the crosslinking test, neither rapid gelation nor curing in the presence of moisture occurred. After 24 hours, there was only a weakly cross-linked layer on the surface.

EXAMPLE 4

55 Parts by weight of the polysiloxane used in Example 1 were mixed with 2 parts by weight vinyl triethoxysilane. 0.18 part by weight of a solution of 4% potassium hydroxide in methanol was then added. After 10 minutes, 0.5 part by weight of a solution of 2.5% H₃PO₄ in vinyl triethoxysilane was added for neutralization. The mixture had a viscosity of 34.5 Pa·s and behaved in the same way as the mixture of Example 1 in the crosslinking test.

EXAMPLE 5

This Example is intended to show that a silicone sealant can be produced by the process according to the invention ("one-pot process").

0.5 Part by weight of a solution of 0.7% sodium hydroxide and 1% methanol in methyl trimethoxysilane was added to 55 parts by weight of an OH-functional poly(dimethylsiloxane) having a viscosity of 50 Pa·s in a planetary mixer. After stirring for 10 minutes, 0.25 part by weight of a solution of 3.4% H₃PO₄ in methyl trimethoxysilane was added. The following constituents were then successively introduced: 29 parts by weight of a trimethyl silyl-terminated poly(dimethylsiloxane) having a viscosity of 0.1 Pa·s, 9.5 parts by weight of a hydrophobic pyrogenic silica having a specific surface of 130 m²/g, 0.8 part by weight of a silane having the formula H₂NCH₂CH₂CH₂Si(OC₂H₅)₃ and 0.3 parts by weight of a catalyst solution consisting of 65% dibutyl tin bis-(2-ethylhexanoate) and 35% toluene.

The remaining paste was cured for 14 days at 23° C./50% relative air humidity in a layer thickness of 2 mm and was tested in accordance with DIN 53 504:

| | |
|---|---|
| tensile strength: | 1.1 MPa |
| modulus at 100% elongation: | 0.35 MPa |
| elongation at break: | 400% |

To test its storage life, the paste was protected against atmospheric moisture in tubes. After 3 months, the paste showed not signs of crosslinking on extrusion from the tube, but subsequently cured to an elastomer under the effect of atmospheric moisture.

It is understood that the specification and examples are illustrative but not limitative of the present invention and that other embodiments within the spirit and scope of the invention will suggest themselves to those skilled in the art.

What is claimed is:

1. A process for the production of triorganyloxysilyl- or diorganyloxyorganosilyl-terminated poly(diorganosiloxanes) by reacting α,χ-dihydroxypoly(dimethylsiloxanes) with tetraorganyloxysilanes or triorganyloxyorganosilanes of the formula

wherein m is 0 or 1, R¹ is an alkyl, aryl or alkenyl radical and R² is an alkyl radical wherein the process comprises conducting the reaction in the presence of a catalyst consisting of a strongly basic alkali metal compound and neutralizing the reaction mixture after the desired reaction but prior to the occurance of polymer rearrangements.

2. A process according to claim 1 wherein the catalyst is selected from the group consisting of hydroxides, alcoholates and silanolates of sodium or potassium.

3. A process according to claim 1 wherein the neutralization is carried out using an effective amount of a component selected from the group consisting of strong acids, weak acids, and acid releasing compositions.

4. A process according to claim 1 wherein the neutralization is carried out using an effective amount of a component selected from the group consisting of HCl, $H_2SO_4$, $H_3PO_4$, carboxylic acids, $CO_2$ and chlorosilanes.

5. A process according to claim 1 wherein the neutralizing agent is used in excess quantity to that stociometrically required.

6. A process according to claim 1 wherein the base and neutralizing agent are each introduced into the reaction medium in dilute form in a carrier which is miscible with the reaction medium.

7. A process according to claim 1 wherein $R^1$ group of the silane compounds is substituted with a group selected from the group consisting of —SH, —NH$_2$, $H_2NCH_2CH_2NH-$, $CH_2=C(CH_3)COO-$,

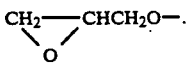

* * * * *